United States Patent [19]

Van Overmeire

[11] Patent Number: 5,072,292
[45] Date of Patent: Dec. 10, 1991

[54] HD-MAC TELEVISION SIGNAL ENCODING UTILIZING VECTOR POINTER ASSIGNMENT

[75] Inventor: Philippe A. M. Van Overmeire, Eindhoven, Netherlands

[73] Assignee: U.S. Philips Corporation, New York, N.Y.

[21] Appl. No.: 538,356

[22] Filed: Jun. 14, 1990

[30] Foreign Application Priority Data

Jun. 14, 1989 [NL] Netherlands .......................... 8901505

[51] Int. Cl.$^5$ .............................................. N04N 7/12
[52] U.S. Cl. .................................... 358/105; 358/133; 358/138
[58] Field of Search ............... 358/105, 138, 136, 140, 358/141

[56] References Cited

U.S. PATENT DOCUMENTS 4,692,806  9/1987  Anderson et al. ................... 358/166
4,965,667  10/1990  Trew et al. ......................... 358/105

Primary Examiner—Victor R. Kostak
Attorney, Agent, or Firm—Michael E. Marion

[57] ABSTRACT

In a method of encoding a television signal having a video signal, the method comprising producing an encoded television signal in accordance with a motion-compensated processing of the video signal, determining vectors in a first picture period of two consecutive picture periods of the video signal, and, in a second picture period of the said two consecutive picture periods, determining pointers to the vectors determined in the first picture period, a substitute pointer pointing to a vector which is indeed to be transmitted is searched if a pointer thus determined does not point to a vector to be transmitted, so that a television signal encoding with an improved picture quality can be obtained.

3 Claims, 4 Drawing Sheets

HD-MAC TELEVISION SIGNAL ENCODING UTILIZING VECTOR POINTER ASSIGNMENT

BACKGROUND OF THE INVENTION

The invention relates to a method of encoding a television signal having a video signal, the method comprising: producing an encoded television signal in accordance with a motion-compensated processing of the video signal; determining vectors in a first picture period of two consecutive picture periods of the video signal; and, in a second period of the said two consecutive picture periods, determining pointers to the vectors determined in said first picture period.

Such a method is described in the article "HD-MAC coding for Broadcasting of High Definition Television Signsl", read at the Club de Rennes Young Researchers' Seminar, M.I.T. Cambridge, Mass., U.S., Oct. 9–13, 1988. Herein the problem is met that in a picture of the video signal, flashing of parts having a lower resolution appear to occur.

SUMMARY OF THE INVENTION

It is, inter alia, an object of the invention to provide a television signal coding having a higher picture quality.

According to the invention, a method of the type defined in the opening paragraph, is characterized by searching a substitute pointer to a vector to be transmitted if a pointer thus determined points to a vector to be transmitted.

As is explained in said article, for a block of picture elements in the second picture period the best vector of a group of vectors is looked for namely the vector determined for a block at the same location in an image of the video signal in the first picture period, if the motion-compensated processing is opted for for this block, and the vectors determined for the eight blocks surrounding the said block. If this best vector is satisfactory, a pointer of this vector is transmitted to the block in the second picture period and the motion-compensated processing is chosen for this block.

The invention is based on the analysis that in said article, if this best vector is not satisfactory or is not transmitted, because the motion-compensated processing is not opted for for the accompanying block in the first picture period, the processing having the resolution lower than the resolution belonging to the said motion-compensated processing is opted for for the block in the second picture period.

According to the invention, if this best vector is not transmitted, because the motion-compensated processing is not selected for the associated block in the first picture period, the processing having the lower resolution is not immediately chosen for the block in the second picture period, but it is first investigated whether there is perhaps a substitute vector which is also satisfactory and may be transmitted in said group of vectors.

Preferably, a substitute vector is only determined during this investigation if this vector does not deviate for more than a criterion from the previously determined best vector. A criterion, which appeared to be very satisfactory in practice, provides the first substitute vector, which minimizes both the dimension of a difference vector between the substitute vector and the previously determined best vector, and the maximum of x and y-components of the substitute vector, provided that the sum of the x and y-components of the difference vector is less than a value of 3.

The television signal coding according to the invention may advantageously be applied in a HD-MAC television signal encoding system, as disclosed in the non-prepublished French Patent Application 88.08301 (U.S. patent application Ser. No. 366,802, filed June 14, 1989) which is herein incorporated by reference.

The description which will follow, with reference to the accompanying drawings describing non-limiting illustrative embodiments, will provide a good understanding of a high definition television transmission system in which the present invention may be implemented.

DETAILED DESCRIPTION OF THE FIGURES

The purpose of the system described here by way of example is to transmit images emanating from generators with 1152 useful lines, each of 1440 pixels, by using only one video pass band equal to that of a standard of 625 lines (576 useful lines of 720 pixels).

In order to permit the reconstruction of a part of the missing video information, digital data are associated with the video data.

For the transmission of the video signals, three different modes are used.

In an "80 ms" mode, with the aid of an appropriate digital filtering, the transmission takes place, for example, first of all during a period of 20 ms, of the odd pixels of the odd lines, during the following 20 ms of the odd pixels of the even lines, during the following 20 ms of the even pixels of the odd lines, and then finally of the even pixels of the even lines, the time employed for totally transmitting an image being therefore 80 ms. Nevertheless, during each period of 20 ms, the entire surface of an image is described; this permits compatibility with the old 625-line standards. By appropriately re-combining the pixels described in the course of four consecutive periods each of 20 ms, it is possible to recreate a high definition image. To do this, it is necessary that the source image should virtually not have varied in the course of the 80 ms. This mode is therefore applicable to fixed or quasi-fixed images.

In a "40 ms" mode, still after appropriate digital filtering, the transmission takes place, for example, of only the even lines, all the pixels of which are transmitted on two occasions. During a period of 20 ms the transmission takes place of the odd pixels, and then during the following period of the even pixels (it would also be possible to contemplate the transmission of only one pixel in two, but for all the lines). Accordingly, one half of the definition has been lost, but the image is described in 40 ms, that is to say twice as fast as in the "80 ms" mode; this permits certain movements.

Figure 1:
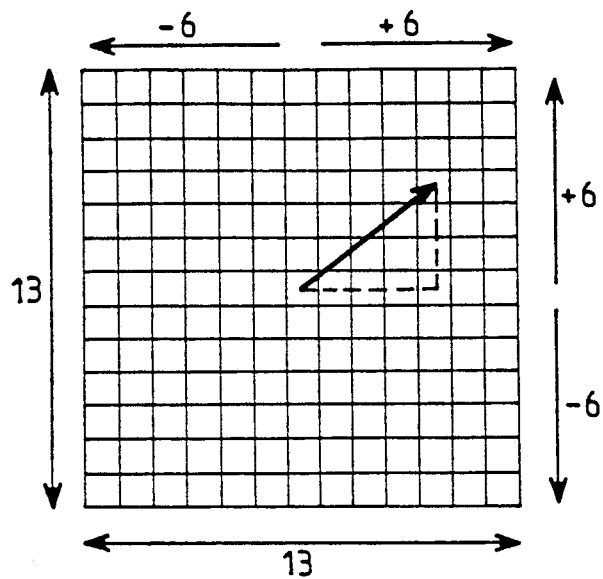
FIG. 1 illustrates a mode of definition of a motion vector.

In this "40 ms" mode, a motion vector is moreover available for each image part. FIG. 1 shows a motion vector, which represents the displacement of an object in the image in the course of time, and which has in this case co-ordinates $x = +4$, $y = +3$ expressed in pixels/40 ms. If a requirement is imposed of not processing co-ordinates greater than ±6 pixels, each possible motion vector corresponds to the distance between the central pixel at the origin of the vector and one of the pixels each represented by one of the squares of the chequered pattern of 13×13 which is illustrated by FIG. 1; this represents 169 possible vectors.

The motion vector permits the creation in the receiver, of an intermediate image and the temporal insertion thereof between two transmitted images. In order to create an intermediate image, a start is made from a transmitted image, and the movable parts are displaced therein along the appropriate motion vector, which is indicated by the transmitter. It is also possible to make use of the two images between which a supplementary image is to be inserted. For further details on the manner of recreating this image it is possible to refer to the publication mentioned in the preamble. By virtue of the image thus added, there is a further doubling of the temporal definition of the image; this permits the use of this mode even when large motions are present in the image. Nevertheless, the intermediate image is correct only if the motions are stable or quasi-stable. In the opposite case, where high accelerations are present, use is made of a third "20 ms" mode.

In the "20 ms" mode, the transmission takes place only, during a period of 20 ms, of for example the odd pixels of the odd lines, and in the course of the following 20 ms the transmission takes place, in an identical manner, of a new image. Thus, the temporal definition is excellent, on account of the fact that the image repetition rate is 50 Hz; this permits the transmission of all the movements without blur effects or jerky movement effects. On the other hand, the spatial definition is low (only one pixel in four has been transmitted) and corresponds to that of the 625-line standard. This is not too troublesome, since the eye is less sensitive to the absence of spatial definition when the objects observed move rapidly.

The image is divided into parts, for example in this case squares of 16×16 pixels, and for each one of these parts or "blocks", a different mode may be used. Further, in the case of movable objects in front of a background landscape, the latter will be able to be described with all its details in the "80 ms" mode, while within polygons formed of squares of 16×16 pixels and surrounding the movable objects most closely, a "40 ms" or "20 ms" mode will be locally used.

Moreover, in order to simplify the processing of the data, it is appropriate to process the sequences of images within the framework of invariable time intervals of 80 ms, and not to divide these 80 ms into more than two different phases. Each interval of 80 ms is processed as an independent whole, that is to say independent of the adjacent intervals.

Figure 2:
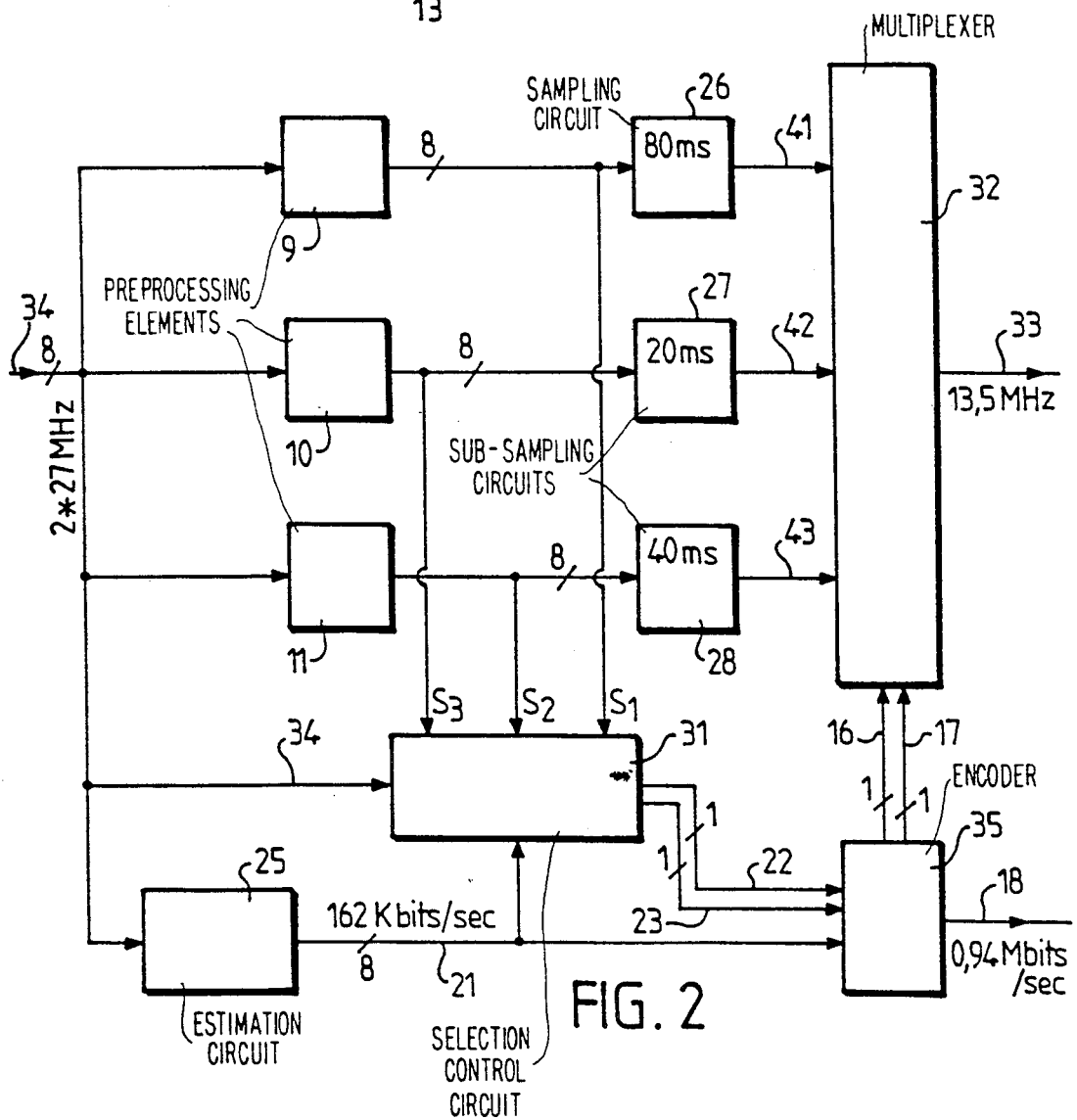
FIG. 2 is a block diagram of the assembly of the encoding circuits of a transmission system.

FIG. 2 represents a block diagram of an encoding system on transmission, in order to define the context of the invention as well as its substantive situation.

The images arrive sequentially, according to a line scanning, at the connection 34. They are processed simultaneously by three parallel channels, respectively (9, 26), (10, 27), (11, 28).

The "80 ms" channel comprises, in cascade, a pre-processing element 9, and a sampling circuit 26 performing "sub-sampling", that is to say a sampling at one quarter of the frequency which corresponds to the complete definition of the pixels. This branch describes a complete image in 80 ms.

The "20 ms" channel comprises, in cascade, a pre-processing element 10 and a sub-sampling circuit 27, sampling a complete image in 20 ms. This channel describes a complete image, with low definition, in 20 ms.

The "40 ms" channel comprises a pre-processing element 11 and a sub-sampler 28. It transmits one image every 40 ms.

The input signal 34 is also passed to a circuit 25 for the estimation of the motion vectors, which computes the motion corresponding to each one of the image parts as defined hereinabove. This circuit 25 supplies on the connection 21 the value of the motion vectors.

A selection control circuit 31 receives at the same time the description of the original image by the connection 34, the speed vectors by the connection 21, and the description emanating from each one of the three channels by its inputs $S_1$, $S_2$, $S_3$. This complex circuit performs, for each square of 16×16 pixels, on the basis of each one of the three channels, a decoding simulating that which might be undertaken on reception, particularly with the aid of the motion vector in the case of the "40 ms" channel, and compares with the original image 34 the images decoded on the basis of each one of the three channels. The channel of which the decoded image is closest to the original image is selected, a specific choice thus being made between the three modes for each one of the squares. This control circuit 31 supplies simultaneously on the connections 22, 23, respectively, two decisions concerning two successive images.

The reference 35 designates a block which contains in particular the means for transmitting, on an associated digital channel, data defining the mode selected for each one of the parts and all the motion vectors of the parts for which the first mode is selected. It may also comprise elements for the correction of the decisions emanating from the selection control circuit 31. The motion vectors are supplied to it by the connection 21, and the initial decisions by the connections 22, 23. The corrected decisions are supplied on the connections 16, 17, and the digital elements to be transmitted on the connection 18.

Depending on the decisions 16, 17 and on the basis of the signals 41, 42, 43 supplied by the three channels, a multiplexer 32 transmits the selected channel on the analog output 33 having a compressed pass band.

With the exception of the DATV encoder 35, all these elements form part of the prior art, and a more detailed description, particularly with regard to the processes for pre-processing and for sampling, is provided by the document mentioned in the preamble, and also by the document "An HD-MAC coding system" by F. W. P. Vreeswijk et al, presented at the Aquila conference, 29 Feb.-3 Mar. 1988, and by the French patent application No. 88-05,010 (PHF 88-522) filed earlier, which are incorporated here by reference.

The invention may be applied to the motion estimator 25, the operation of which is based on a block comparison algorithm ("BMA").

Figure 3:
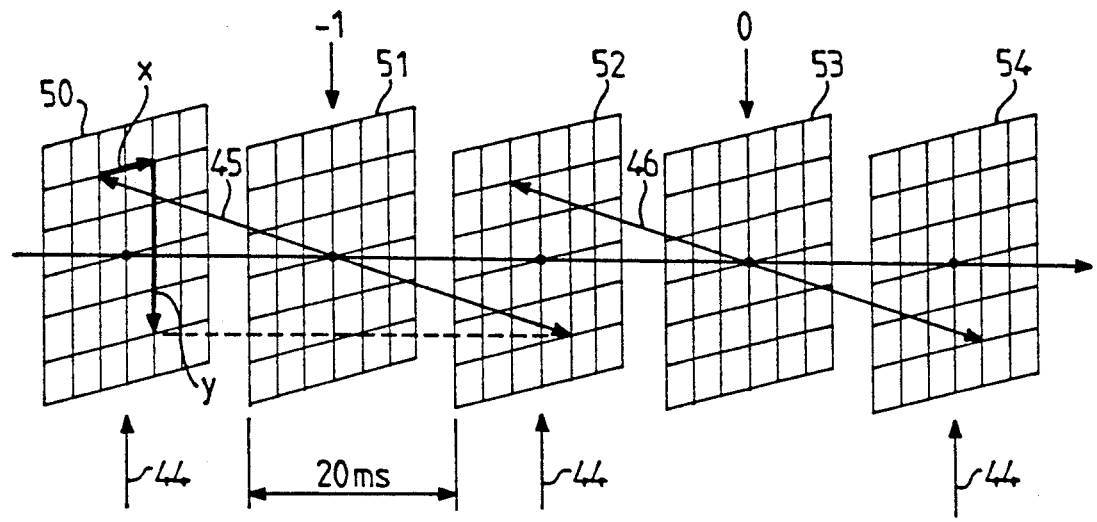
FIG. 3 illustrates the definition of various images mentioned in the description of the invention.

FIG. 3 shows five chequered patterns with 36 squares, which each symbolise the same 36 pixels of five temporally consecutive original images 50 to 54. These images are represented symbolically one in front of the other in perspective, but in reality there is only a single visual display support; the image 50 is that obtained at a given instant and the image 54 is that obtained 80 ms later. The images represented are those which are all present within the framework of a time interval of 80 ms mentioned above.

The images 50 and 54 are at the same time the last image of an interval, and the first image of another interval; they are present in each one of the intervals on which they border. The motion estimation is undertaken for the first interval of 40 ms with the three images 50, 51, 52, and then for the second interval of 40 ms with the three images 52, 53, 54. The even-numbered images therefore "serve" on two occasions.

The images effectively transmitted are indicated by arrows 44. The original images 51 and 53, which are available at the camera output, are not transmitted and will have to be recreated on reception, on the basis of a motion vector. For example, a motion vector having a horizontal amplitude x of 2 pixels per 40 ms and a vertical amplitude y of 4 pixels per 40 ms corresponds to the displacement indicated by the arrows 45 or 46.

Any type of motion estimator may be used for the pair of images 50-52. For the following pair 52-54, the estimator must be of the BMA type. For the sake of simplification, it is assumed here that an estimator of the BMA type is used in all cases.

The search for the motion vector then consists, in the presence of a first and of a second successive image 50-52, in examining a part of one of the images, for example 52, in comparing it in turns with a series of parts of the other image, for example 50, these parts occupying a series of position such that, if they were each displaced along one of the possible motion vectors, they would coincide with the examined part. The motion vector selected following such a series of comparisons is, of course, that which corresponds to that one of the parts of the series under consideration which offers the greatest similarity to the examined part of the image 52. An example of a function expressing such a similarity is given hereinbelow.

Figure 8:
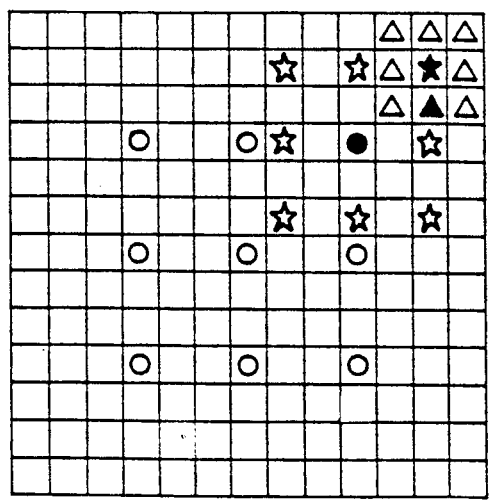
FIG. 8 illustrates an algorithm for the determination of a motion vector.

A priori, introducing a limitation to motions of $\pm 6$ pixels/40 ms, the possible vectors are those illustrated by FIG. 1: there are 169 of these. In practice, no 169 comparisons are carried out, by virtue of a three-stage process which is illustrated by FIG. 8, and which consists in exploring first of all only the series of positions indicated by circles in the figure. Then, assuming that the position indicated by the black circle has given the best result, the positions indicated by stars are explored, and finally the positions indicated by triangles, around the star which has given the best result. Thus, the number of comparisons to be carried out in the case of a maximum motion of $\pm 6$ pixels/40 ms would be 25.

In practice, consideration is given not only to the images 50 and 52 but also to the image 51, the minimization function which expresses the similarity between two squares relying on the semi-sum of the differences of intensities of pixels between the image 51 and the image 50 on the one hand, and between the image 51 and the image 52 on the other hand. Thus, a determination is made of a single motion vector for a pair of images 50, 52, and a determination will then be made of another motion vector for the pair of images 52, 54. It is in the determination of this second motion vector appropriate for the pair 52, 54 that the invention is operative.

In the presence of the new pair of images 52, 54 which follows the pair 50, 52, the manner of proceeding is different. In this pair, the first image 52 is also the second image of the preceding pair, for the parts of which motions have already been determined in relation to the first image 50.

Figure 4:
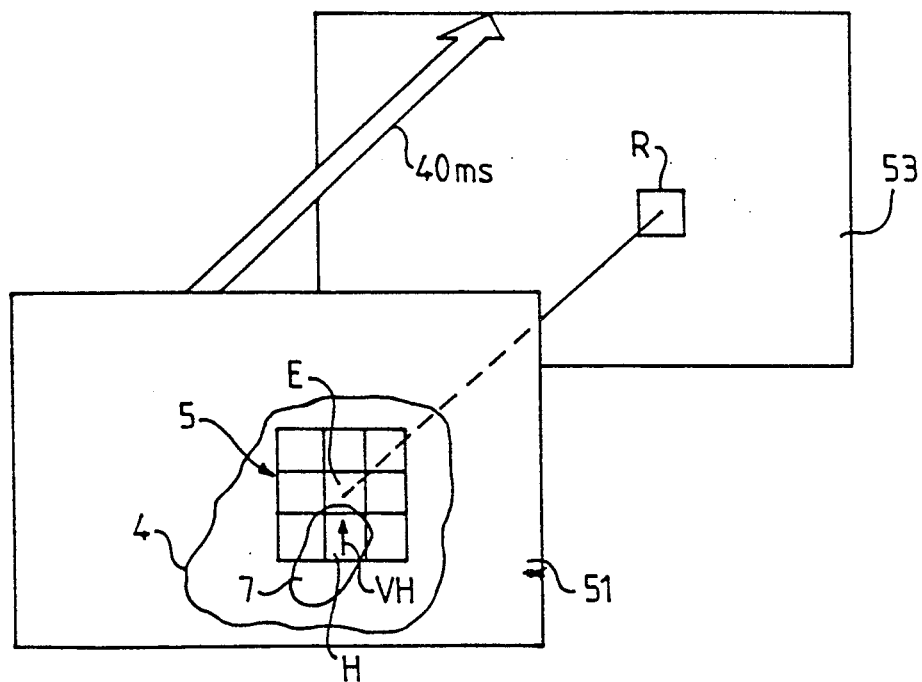
FIG. 4 represents image parts in two successive different images.

FIG. 4 shows a part R in the course of examination in the image 53. With this part R there is associated a group 5 of a plurality of parts of the preceding image 51. This group contains the part E occupying in the image the same position as the part R examined, and likewise the eight adjacent parts which surround the part E.

Now, instead of considering as possible for the element R all motion vectors of amplitude less than or equal to $\pm 6$ pixels, that is to say one hundred and sixty-nine vectors, consideration is given only to the nine vectors corresponding to the nine parts of the group 5, these vectors having been determined in the course of the examination of the image 51 associated with the preceding pair of images 50, 52.

These nine motion vectors give rise to nine comparisons between the part R and the nine parts (not represented) occupying positions such that, if they were each displaced along one of the nine motion vectors in question, they would coincide with the part R. In the course of these comparisons use is made of semi-sums of differences between the images 52, 53, 54, as in the case of the images 50, 51, 52: only the number of comparisons is different, and the same hardware or software equipment can be used, to a large extent. This appears in the device of FIG. 5, which permits the estimation of motion according to the invention, and which comprises two sets of similar elements.

A first set 29, 57, 58, 49, 61 is identical to the device of the prior art as described in the document mentioned in the preamble. At the input, the spatial filter 29 ensures an appropriate pre-filtering; two delay elements 57, 58 each contribute a delay of 20 ms, that is to say equal to the time between two source images. The three connections 50, 51, 52 thus each carry, at the same instant, information regarding parts corresponding to successive images. (The references of these connections are the same as those of the image which correspond to them respectively, in FIG. 3.) The element 49 for correlation between frames effects the computation of a function C expressing the difference between images parts, for example:

$$C(V) = \sqrt{\sum_{j=1,\ldots N} \left( I(P_j, F_i) - \frac{I(P_j - V, F_i - 1) + I(P_j + V, F_i + 1)}{2} \right)^2}$$

where
V is the order number of the vector considered among those which are possible:
N is the number of pixels of an image part
I (Pj, Fi) is the intensity of the pixel Pj of the field Fi
Pj±V is the pixel offset in relation to Pj by a quantity corresponding to the vector.

The element 61 records all the values of C(V) determined by the element 49 and indicates which is the smallest.

According to the invention, the device is supplemented by another assembly comprising two delay elements 55, 56 in such a manner as to process the five images of FIG. 3 at the same time, and a second set of elements 48, 60 corresponding respectively to the elements 49, 61. The set 49, 61 processes the parts of images 50, 51, 52 while the set 48, 60 processes the parts of images 52, 53, 54. The results of the groups of images 50-52 and 52-54 are supplied respectively to the output connections 62, 63.

The element 59 is constituted by delay elements, the principle of which will be explained in greater detail herein below with reference to FIG. 7 which permit the presentation at the same time, of the nine vectors of the elements of the group 5 of FIG. 4, and the supply thereof to the element 48. The element 48 is different from the element 49 in that, instead of considering all the possible vectors (see FIG. 2), it considers only the nine vectors which the element 59 supplies to it.

The two elements 49, 48 operate one after the other, because one needs the results of the other in order to operate.

For two successive pairs of images, the comparisons relate to twenty-five motion vectors per image part for the first pair, and nine motion vectors for the second pair, i.e. in total 34 comparisons, in place of 2×25=50 in the prior art. The gain is significant and permits, for example, the processing of motion vectors of larger maximum amplitude, with an equipment of given performance. When the maximum amplitude increases, the gain in time contributed by the invention tends towards two.

This device operates very well for the following reasons:

let us consider the group of nine squares comprising the square E in FIG. 4 and the adjacent squares. If the image comprises an object 4, which is larger than the group and which covers it, this object moving in a single block, all the motions corresponding to the nine parts are the same, and if the object 4 still covers the square R in the following image and its motion has not varied, the motion corresponding to the square R is also the same. The motion corresponding to the part R of the image 53 is equal to that corresponding to any one of the nine squares of the image 51, the central square, for example. This case is fairly frequent.

it may also be that in front of an immovable background a small object is moving, for example an object 7, covering the square H, having a motion VH of co-ordinates x,y. Let us assume, first of all, that x=0, y=16. This is only an instructional case, but its analysis is very simple. After a period of time of 40 ms, the object, maintaining the same motion, has ascended by 16 pixels: it covers the square R of the image 53. A definition is then given of the motion of the square R by indicating that it is equal to that of the square H of the image 51 (the term "motion of the square" must be understood as "motion of the object occupying the square").

If, in a more general way, the motion is, for example, x=0, y=4, it is necessary to have four times 40 ms in order that the object 5 should ascend by one square. While it occupies only a very small surface of the square R, where the background is, for example, immovable, the motion of this square R is zero: it is that of the square E of the image 51. When the object occupies a medium proportion of the square R of the image 53, it may be that no motion vector is appropriate: a change is then made to the "20 ms" mode for this square. As from the moment when the object occupies a very predominant surface of the square R, the motion for this square becomes that of the object 7, that is to say that of the square H of the image 51 (assuming that the object is large enough to cover the two squares at the same time).

There has thus been the discovery of a means for being able to determine in the majority of cases the motion corresponding to a part of an image in relation to parts of the preceding image, the data of which have already been determined. As the greatest vectors which it is agreed to consider in the "40 ms" mode are less than 16 pixels/40 ms, an object cannot, in 40 ms, come from a square further distant than the adjacent square. It is thus unnecessary to consider more than nine squares in the image 51.

The determination of the motion vector in the images 52-54 results from a minimization process. The most probable motion has thus been found from among those which are possible. It is further necessary to verify that the decoded image which emerges therefrom is the best one.

To this end, means are provided for carrying out a decoding simulating the decoding on reception and for determining, by comparison between the decoded image and the original, the degree of quality of the part of the second pair of images in the process of processing, having the motion vector determined as described herein above. These means simply consist of the selection control circuit 31 which processes the parts of images 52-54, with their motion vector determined according to the invention, precisely in the same way as it processes the parts 50-52 in a known manner.

Moreover, the invention also permits the performance of the transmission of the speed vectors of a second pair of images such as 52, 54 with a reduced digital throughput, this taking place independently of the fact that use has or has not been made of the invention in the motion estimator.

The computation of the required digital throughput will now be explained: in order to fill each interval of 80 ms which is processes as a whole, there are only five possible cases:

1—with a single "80 ms" image
2—with a "40 ms" image followed by two "20 ms" images
3—with two "20 ms" images followed by one "40 ms" image
4—with two "40 ms" images
5—or with four "20 ms" images.

For each interval of 80 ms, the definition of the case used among the five cases described here above, as well as data associated with each one of the modes, must be transmitted to the receivers. The required number of bits is dependent upon the number of possible situations: the first case 1 corresponds to a single situation. It is the same for the case 5. On the other hand, in the cases 2 and 3 which comprise a "40 ms" mode, it is necessary to transmit the value of the motion vector as well.

Let us assume, first of all, that the invention is not implemented. Let consideration be given to a motion vector with a maximum amplitude (in each vertical/horizontal direction) of ±6 pixels. This corresponds to $13^2 = 169$ possible vectors, i.e. 169 possible situations (see FIG. 1).

In the case 4, it is necessary to define two vectors (one for each one of the two periods of 40 ms); this corresponds to 169 first vectors × 169 second vectors, i.e. $169^2$ situations.

The total number of situations corresponding to the five cases is the sum of the situations in each case, i.e.:

| Case 1 | 1 |
| --- | --- |
| Case 2 | 169 |
| Case 3 | 169 |
| Case 4 | $169^2$ = 28561 |
| Case 5 | 1 |
| Total | 28901 |

One situation from among 28901 can be defined by means of 15 bits.

These 15 bits must be redefined for each one of the parts of the image. If these parts are squares of 16×16, in an image of 1440×1152 pixels, there are 6480 parts. Moreover, there are 12.5 intervals of 80 ms per second. In total, a throughput of 15 bits × 6480 squares × 12.5 intervals = 1215000 bits/second will be necessary. This throughput is greater than that which it is intended to allocate to this type of information in, for example, the D2MAC packet standard (approximately 1 M bits/s during the field returns).

There is thus an obligation, in the prior art, to limit the vectors to ±3 pixels. In fact, there are then, for each square, $7^2 = 49$ possible vectors, and in total to describe the five cases: $1 + 49 + 49 + 49^2 + 1 = 2501$ situations, which 12 bits can describe. The throughput is then 12 × 6480 × 12.5 = 972000 bits/sec, which is acceptable. However, it is regrettable to limit the magnitude of the motion vectors which can be used to the detriment of the quality of the image. An attempt was therefore made to find a means for transmitting vectors of ±6 pixels or even larger still, with an available maximum digital throughput of approximately 1M bits/second.

Let us assume that all the motion vectors have been evaluated for all the images, with or without the motion estimator according to the invention, and that the selection control circuit 31 has selected the 40 ms mode for an image part of the second period of 40 ms of an interval of 80 ms. As the system is equipped with means similar to those described hereinabove with reference to FIG. 4, these means associate the nine parts 5 of an image of the first period of the interval of 80 ms with the part R of the second image of this interval. Means are provided for comparing the motion vector of the part R with each one of the motion vectors of the nine parts 5. For this comparison, it is possible to choose to seek the total identity or only a difference less than a predetermined threshold.

If there is total identity between a motion vector of a part of a group 5 and the motion vector of the part R, it is possible to confirm the selection of the 40 ms mode for the part R of the second period of the interval of 80 ms, and to transmit the value of the corresponding motion vector, not by reference to the 169 sets of possible co-ordinates (FIG. 1), but quite simply by indicating from which element of the group 5 the comparison was positive. There are thus nine possibilities only, instead of one hundred and sixty-nine, and the digital throughput can be considerably reduced.

If a choice has been made in favour of seeking only the smallest difference or a difference less than a predetermined threshold, on account of the difference then possible between the "true" vector of the square R and that of the square of the group 5 which it is desired to use in its place, it may be that the "40 ms" mode is no longer the best for the part R. It is then necessary to provide means for determining, by comparison between the decoded image and the original, the selection of the most satisfactory mode for the examined part having the motion vector of the element of the group 5 which is the closest to that of the element R.

To state that the "40 ms" mode has been adopted for the second phase of an interval of 80 ms signifies that one of the cases 3 or 4 mentioned hereinabove is applicable: the case 3 is also possible since, even if the "20 ms" mode has been selected for the element E during the first phase of the interval, comparisons are nevertheless capable of being carried out with other parts adjacent to E in the group 5, for which parts the "40 ms" mode was selected in the first phase.

These means are once again, of course, those of the control circuit 31 (FIG. 2) and, in the case where they would confirm the selection of the 40 ms mode for the part R, the value of the motion vector is transmitted as previously, indicating for which element of the group 5 the comparison was positive.

In the case where no comparison is positive, it would be possible to transmit the motion vector of the square R by its co-ordinates, but this process exhibits the disadvantage that the required digital throughput is larger and unforeseeable. It is therefore both simpler and more satisfactory to change over again to the "20 ms" mode.

In the case where the BMA motion estimator making use of the invention has been employed, the transmission of the motion vector is, of course, base on the same principle, that is to say that the transmission means indicate for the second period, which is that one of the elements of the group which has provided the optimal motion vector.

The total number of situations for the five cases set forth hereinabove is now:

| Case 1 | 1 |
| --- | --- |
| Case 2 | 169 |
| Case 3 | 169 (or 9) |
| Case 4 | 169 × 9 |
| Case 5 | 1 |
| | 1861 |

A situation from among 1861 can be defined by means of 11 bits; this now corresponds to a throughput of 891,000 bits/second which is entirely compatible with the capacity offered by the field returns of the D- and D2MAC packet standards.

The television receivers intended to use associated digital data permitting the processing of an image are equipped with pixel memories, and in the case where motion vectors are provided, the receivers are also equipped with memories to record these vectors. As a result of this, it is possible to find the motion vectors of the preceding image, in the receiver, with the memory means normally provided. The only element to be added in order to implement the invention is a very simple processor element which, on the basis of the knowledge of the image part in the course of processing and of the number, received from the transmitter, designating one of the nine parts of the preceding image (according to the description appearing hereinabove), computes the memory address at which the motion vector of the designated part is located, initiates reading thereof, and inscribes it as motion vector of the current part. In practice, as the receiver is equipped with a processor system which carries out digital operations apertaining to the parts of images, the additional element referred to hereinabove is provided by software means, which a person skilled in the art can construct easily.

In order to make a further gain on the throughput of data, the transmission system may further comprise means for determining in the set of motion vectors, in the course of the processing of the image 51 referred to as the preceding image, associated with the images 50, 52, a sub-set containing the motion vectors which are encountered most frequently and for transmitting once per image the characteristics of all the motion vectors of the sub-set, the motion vector of each image part then being defined by reference to this sub-set. If the variation vector of an image part to be transmitted is not an element of this sub-set, the second mode is used for this image part.

With this arrangement, the digital throughput which is necessary to define the first image 51 is further reduced. On the other hand, it may be that one or more of the squares of the group 5 have been processed in the "20 ms" mode in the image 51 (because their speed vectors do not form part of the said sub-set) while the square R of the image 53 may itself be processed in the "40 ms" mode. Nevertheless, there is no renouncing of the application of the invention, but there is then a limitation of the search for identity to those of the squares of the group 5 which have been processed in the 40 ms mode.

Figure 6:
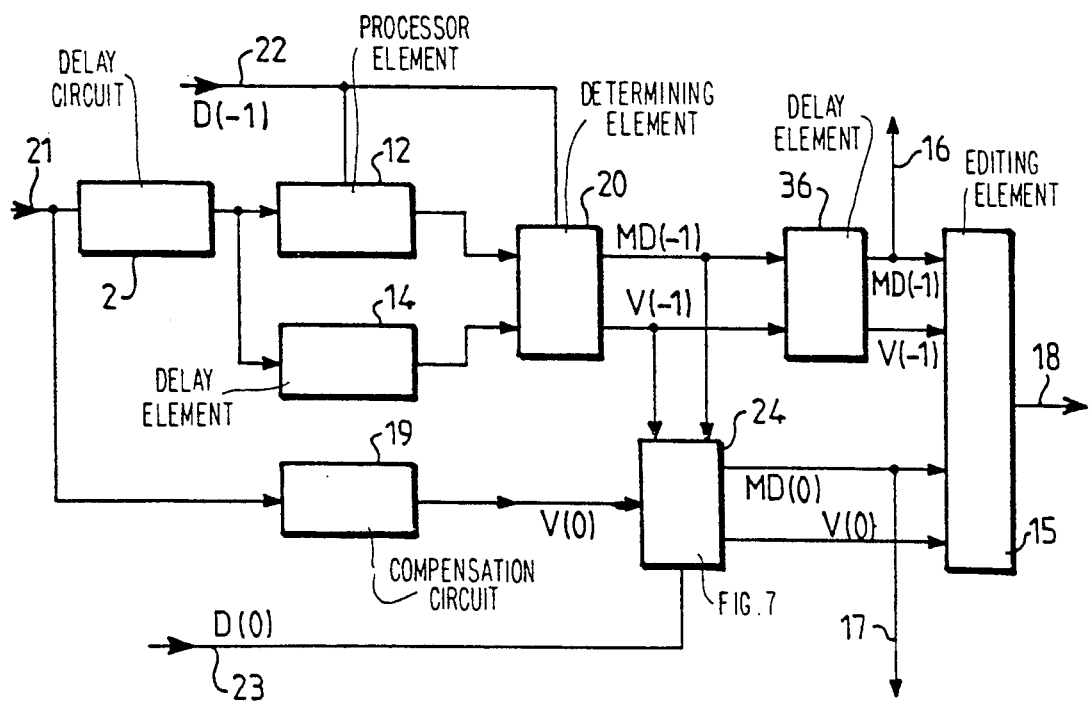
FIG. 6 is a detailed block diagram of circuit elements serving for the implementation of another part of the invention.

These means may be implemented by virtue of the circuit of FIG. 6, which is a part of the DATV encoder 35 of FIG. 2.

The indices 0 and −1 used in this figure refer respectively to an image and to the preceding image.

The decisions (of selection between the three modes) D(−1) and D(0) emanating from the selection control circuit 31 of FIG. 2 are conducted for the connections 22, 23. The motion vectors are supplied on the connection 21.

The motion vector signal passes through a circuit 2 contributing a delay of 40 ms, in order to place each vector of the image 0 in phase with that of the image −1. A circuit 12 receives this delayed motion vector and also the decision D(−1) of selection of one from among the three channels, concerning the image −1. The circuit 12 is a processor element which, following the complete description of an image, establishes a classification of the motion vectors by order of frequency of occurrence and supplies to an element 20 the description of the sub-set of the most frequent vectors. The motion vector signal present at the input of the circuit 12 is transmitted to the element 20 by a delay circuit 14, which corresponds to the time employed by the processor 12 to establish the classification. The element 20 determines whether the motion vector transmitted by the circuit 14 forms part of the sub-set delivered by the processor 12. If this is not the case, the decision D(−1) is possibly modified in order to impose the selection of the "20 ms" channel. The modified final selection signal is referenced MD(−1). If the "40 ms" mode is selected (the motion vector forms part of the sub-set) the number of the corresponding motion vector (V(−1) is supplied. The selection effected by means of the elements 12, 14, 20 is that concerning the first "40 ms" image of an interval of 80 ms.

Through a circuit 19 for the compensation of delay corresponding to the duration of the various processings executed in the elements 12, 20, the motion vector is conducted to the element 24. The decision D(0) concerning the image 0, on the connection 23, is also conducted to the element 24, as well as the decision MD(−1) and the vector V(−1).

Figure 7:
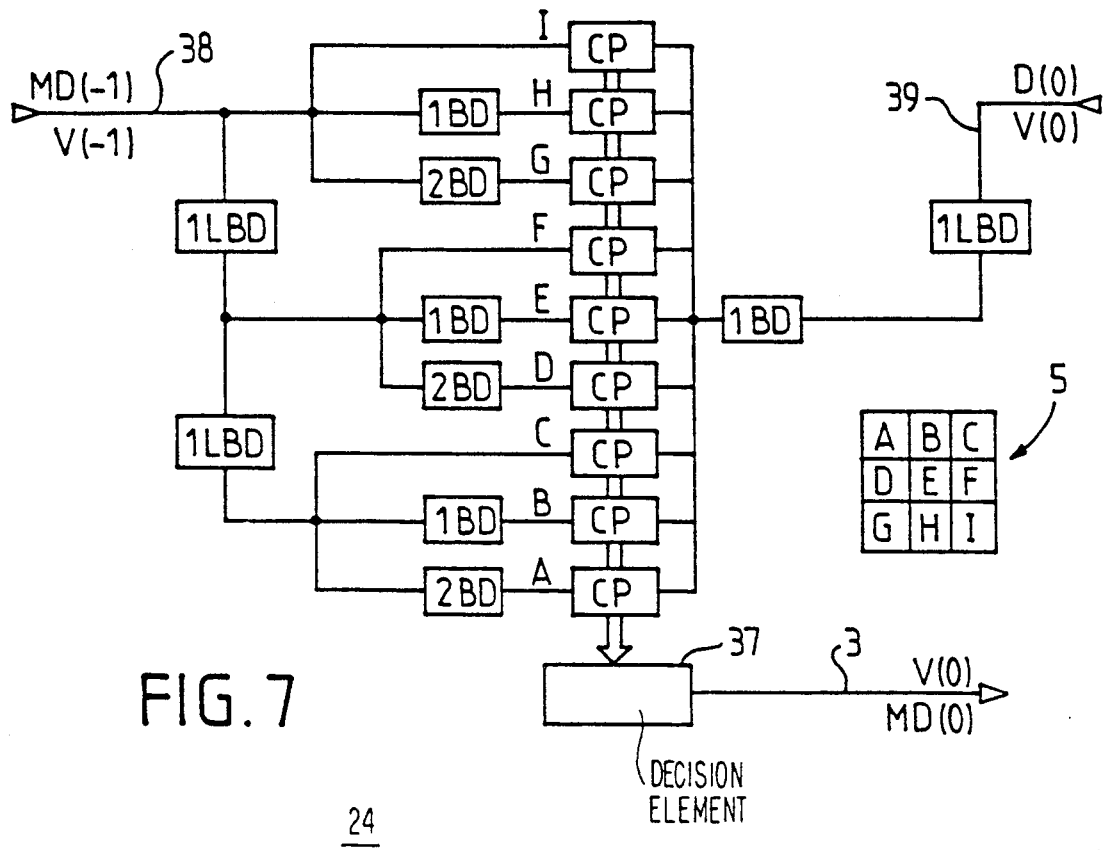
FIG. 7 is a detailed diagram of the element 24 of FIG. 6.

The element 24 is described in greater detail in FIG. 7. It finally supplies the decision MD(0) and possibly the vector V(0) to the shaper circuit 15 which receives on the one hand the description of the sub-sets of motion vectors to be transmitted once per period of 80 ms, and then for each image part the decision MD(−1) and the decision MD(0) as well as possibly the two corresponding motion vectors V(0) and V(−1). The element 36 is a delay element which compensates for the delays introduced by the element 24.

The element 15 edits the data and supplies them to the output 18, to be transmitted according to a predetermined format on the digital transmission channel.

The circuit 24 detailed in FIG. 7 receives the decisions and—where appropriate—the corresponding vectors on the connections 38, 39 respectively for the images −1 and 0. Elements referenced 1BD, 2BD and 1LBD are delay elements contributing a delay, respectively, of one image part ("block delay") two image parts, and one line of image parts ("line of block delay"). In other words "1BD" is the time for passing, for example, from a part A to a part B, "2BD" for passing from a part A to a part C and "1LBD" for passing from a part A to a part D. By virtue of the scheme represented, the operation of which, based on the contribution of appropriate delays, is evident, the data concerning the parts A and I of the block 5 are conducted, all at the same moment, to the connections which are themselves also referenced A to I.

Figure 5:
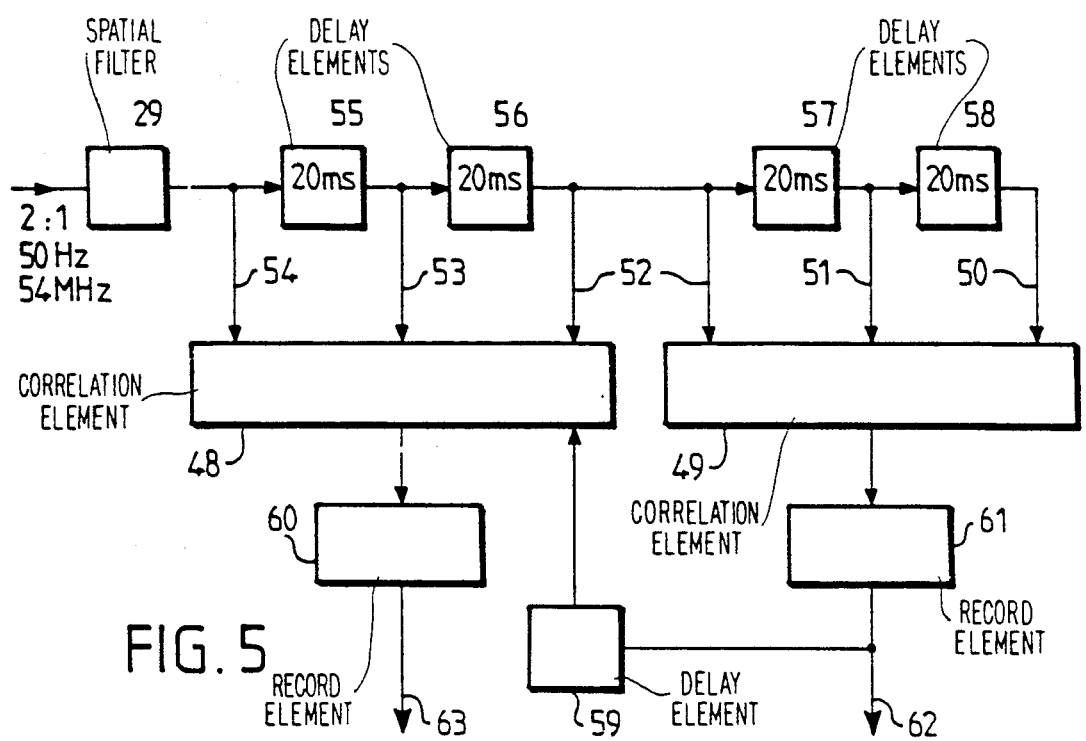
FIG. 5 is a detailed block diagram of circuit elements serving for the implementation of a part of the invention.

A circuit of the same type is used in the element 59 of FIG. 5 to conduct together the data of the nine parts of the group 5 to the computation circuit 48.

In the circuit 24 of FIG. 7, each element referenced "CP" performs the comparison between the co-ordinates of the motion vectors present on its two inputs, at the sides in the drawing. The result of the comparisons is transmitted via a common bus of all the "CP" blocks to a decision element 37 which supplies on the connection 3 the corrected decision MD(0) for the examined image (which is, for example, the image 53 of FIG. 3). If no comparison is positive, the decision MD(0) is the selection of the "20 ms" mode; otherwise, the "40 ms" mode is confirmed and the motion vector is transmitted by means of a digit which designates which one of the "CP" elements corresponding to the connections A to I has supplied a positive comparison.

A comparison may be judged to be positive if there is absolute identity between the co-ordinates of the motion vectors compared. In this case, no new verification of the suitability of the "40 ms" mode is required.

The comparison criterion may also be that the difference between the motion vectors compared is less than a pre-determined threshold. In this case, it is still necessary to perform a decoding simulating the decoding on reception and to determine, by comparison between the decoded image and the original, the selection of the most satisfactory mode for the examined part, having the motion vector determined with the means described with reference to FIG. 7. This decision is advantageously taken by means of the element 31, which has already performed the same comparison between the decoded image and the original for the initial decisions D(0) and D(−1).

If the statistical method described hereinabove for reducing the number of vectors to be transmitted for the first pair of images of a period of "80 ms" is not used, the elements 12, 14, 20 of FIG. 6 disappear, the decision D(−1) being conducted without correction to the element 24.

If, moreover, the means described with reference to FIG. 5 are used, the circuits of FIGS. 6 and 7 become of no avail, because the first decision is taken by the selection control circuit 31 relates immediately to a motion vector selected from among nine, as far as the second pair of images is concerned, and the DATV encoder 35 of FIG. 2 is reduced to a data editing circuit.

I claim:

1. A method of encoding a television signal with a video signal, the method comprising the steps of: producing an encoding television signal in accordance with a motion-compensated processing of the video signal; determining vectors in a first picture period of two consecutive picture periods of the video signal; and, in a second picture period of the said two consecutive picture periods, determining pointers to the vectors determined in said first picture period characterized by searching for a substitute pointer to a vector to be transmitted if a pointer thus determined points to a vector not to be transmitted.

2. A method as claimed in claim 1, characterized in that if a substitute vector to which the substitute pointer points and the vector not to be transmitted to which said first pointer points deviate for more than a criterion from each other, in said second picture period a processing of the video signal is selected which has a resolution lower than a resolution associated with said motion-compensated processing.

3. A method as claimed in claim 2, characterized in that the criterion provides the first substitute vector which minimizes both the amplitude of a difference vector between the substitute vector and the previously determined best vector, as the maximum of x and y-components of the substitute vector, on the condition that the sum of the x and y-components of the difference vector is less than a value of 3.

* * * * *